United States Patent
Lee et al.

(10) Patent No.: US 10,519,262 B2
(45) Date of Patent: Dec. 31, 2019

(54) METHOD OF PREPARING AROMATIC VINYL-UNSATURATED NITRILE-BASED COPOLYMER AND AROMATIC VINYL-UNSATURATED NITRILE-BASED COPOLYMER PREPARED USING THE SAME

(71) Applicant: LG CHEM, LTD., Seoul (KR)

(72) Inventors: Dae Woo Lee, Daejeon (KR); Chang Hun Han, Daejeon (KR); Jae Bum Seo, Daejeon (KR); Jung Tae Park, Daejeon (KR); Gyu Sun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 85 days.

(21) Appl. No.: 15/574,806

(22) PCT Filed: Jan. 31, 2017

(86) PCT No.: PCT/KR2017/001013
§ 371 (c)(1),
(2) Date: Nov. 16, 2017

(87) PCT Pub. No.: WO2017/164507
PCT Pub. Date: Sep. 28, 2017

(65) Prior Publication Data
US 2018/0142049 A1    May 24, 2018

(30) Foreign Application Priority Data
Mar. 22, 2016 (KR) ........................ 10-2016-0034167

(51) Int. Cl.
| | | |
|---|---|---|
| C08F 212/10 | (2006.01) |
| C08K 5/14 | (2006.01) |
| C08F 214/10 | (2006.01) |
| C08F 6/10 | (2006.01) |
| C08F 297/04 | (2006.01) |
| C08L 55/02 | (2006.01) |
| C08F 2/38 | (2006.01) |
| C08F 2/44 | (2006.01) |

(52) U.S. Cl.
CPC .............. *C08F 212/10* (2013.01); *C08F 6/10* (2013.01); *C08F 214/10* (2013.01); *C08F 297/04* (2013.01); *C08K 5/14* (2013.01); *C08L 55/02* (2013.01); *C08F 2/38* (2013.01); *C08F 2/44* (2013.01)

(58) Field of Classification Search
CPC .......... C08L 25/12; C08L 55/02; C08F 6/003; C08F 4/36; C08F 279/04; C08F 212/10
See application file for complete search history.

(56) References Cited

U.S. PATENT DOCUMENTS

| | | | | |
|---|---|---|---|---|
| 5,254,650 | A * | 10/1993 | Fukumura | .............. C08F 212/12 430/109.3 |
| 2003/0032747 | A1 | 2/2003 | Lee et al. | |
| 2004/0256757 | A1* | 12/2004 | Sasaki | ......................... C08J 9/18 264/51 |
| 2006/0051586 | A1* | 3/2006 | Park | ........................... C08J 5/18 428/411.1 |
| 2010/0324231 | A1* | 12/2010 | Yamashita | ................ C08F 2/01 526/64 |
| 2011/0118424 | A1* | 5/2011 | Yamashita | .............. C08F 2/001 526/64 |
| 2013/0150546 | A1 | 6/2013 | Sung et al. | |
| 2014/0039104 | A1 | 2/2014 | Yang et al. | |
| 2015/0376387 | A1* | 12/2015 | Kim | ........................ C08L 25/12 525/73 |
| 2016/0108224 | A1 | 4/2016 | Seo et al. | |

FOREIGN PATENT DOCUMENTS

| | | |
|---|---|---|
| CN | 103080158 A | 5/2013 |
| CN | 103476861 A | 12/2013 |
| EP | 2937366 A1 | 10/2015 |
| EP | 3296332 A1 | 3/2018 |
| JP | S62-273216 A | 11/1987 |
| KR | 10-2000-0055272 A | 9/2000 |
| KR | 10-2002-0048628 A | 6/2002 |
| KR | 10-2002-0059515 A | 7/2002 |
| KR | 10-2004-0073710 A | 8/2004 |
| KR | 10-2008-0059841 A | 7/2008 |
| KR | 10-0843611 B1 | 7/2008 |
| KR | 10-2009-0074974 A | 7/2009 |
| KR | 10-2011-0061757 A | 6/2011 |
| KR | 10-2012-0057186 A | 6/2012 |
| WO | WO-2015002373 A1 * | 1/2015 .............. C08L 25/12 |

OTHER PUBLICATIONS

Extended European Search Report for EP Application No. 17770478.0, dated May 30, 2018.
International Search Report for PCT/KR2017/001013 filed on Jan. 31, 2017.
Chinese Search Report issued in related application No. CN201780001734.3 dated May 14, 2019.

* cited by examiner

*Primary Examiner* — Mark S Kaucher

(57) ABSTRACT

The present invention provides a method of preparing an aromatic vinyl-unsaturated nitrile-based copolymer in which, when an aromatic vinyl-unsaturated nitrile-based copolymer in which a content of a structural unit derived from unsaturated nitrile monomers in the copolymer is in the range of 22 to 30 wt % is prepared, oligomer content and unreacted monomer content are decreased, resulting in excellent heat resistance, significantly improved surface quality, and particularly, reduced generation of residue on a product surface when used in a closed high temperature environment and reduced occurrence of mold deposits during injection molding, and an aromatic vinyl-unsaturated nitrile-based copolymer prepared using the method.

6 Claims, No Drawings

1

METHOD OF PREPARING AROMATIC VINYL-UNSATURATED NITRILE-BASED COPOLYMER AND AROMATIC VINYL-UNSATURATED NITRILE-BASED COPOLYMER PREPARED USING THE SAME

CROSS-REFERENCE TO RELATED APPLICATION

This application is a U.S. National Stage of PCT/KR2017/001013 filed Jan. 31, 2017, which claims priority to and the benefit of Korean Patent Application No. 10-2016-0034167, filed on Mar. 22, 2016, the disclosures of which are incorporated herein by reference in their entirety.

TECHNICAL FIELD

The present invention relates to a method of preparing an aromatic vinyl-unsaturated nitrile-based copolymer in which excellent heat resistance and significantly improved surface quality are attained, and particularly, generation of residue on a product surface when used in a closed high temperature environment and occurrence of mold deposits during injection molding can be reduced due to a decrease in oligomer and unreacted monomer content, and an aromatic vinyl-unsaturated nitrile-based copolymer prepared using the same.

BACKGROUND ART

Generally, heat-resistant styrene-based copolymers, for example aromatic vinyl-unsaturated nitrile-based copolymers such as styrene-acrylonitrile copolymer aromatics, have been widely used in a variety of industrial fields including office automation equipment such as computers, printers, and copying machines, home appliances such as televisions and stereo equipment, electric and electronic parts, automobile parts, and other miscellaneous goods due to having excellent moldability, rigidity, and electrical characteristics. Particularly, aromatic vinyl-unsaturated nitrile-based copolymers which can withstand high outdoor temperatures due to high heat resistance are used in special applications such as housings for home appliances, automobile interior materials, etc.

Further, excellent surface properties such as transparency are necessary for resins used as exterior materials such as food containers, but aromatic vinyl-unsaturated nitrile-based copolymers prepared by conventional preparation methods contain a large amount of oligomers, generating fumes and gas are during the processing of the aromatic vinyl-unsaturated nitrile-based copolymer and resulting in low processability and a decrease in surface properties of the manufactured product, heat resistance, and weather resistance. Accordingly, studies are underway to develop an aromatic vinyl-unsaturated nitrile-based copolymer having a low oligomer content while maintaining the inherent properties of an aromatic vinyl-unsaturated nitrile-based copolymer.

However, although aromatic vinyl-unsaturated nitrile copolymers having excellent impact resistance or excellent impact resistance and heat resistance have been developed through many studies, there is a lack of development of an aromatic vinyl-unsaturated nitrile-based copolymer having excellent impact resistance and heat resistance as well as a low oligomer content and excellent surface properties.

Therefore, it is necessary to develop an aromatic vinyl-unsaturated nitrile-based copolymer having improved surface properties in order to further improve the utility of the aromatic vinyl-unsaturated nitrile-based copolymer.

PRIOR ART LITERATURE (Patent Literature 1) KR 2012-0057186 A

DISCLOSURE

Technical Problem

A first objective of the present invention is to provide a method of preparing an aromatic vinyl-unsaturated nitrile-based copolymer in which, when an aromatic vinyl-unsaturated nitrile-based copolymer in which a content of a structural unit derived from unsaturated nitrile monomers in the copolymer is in the range of 22 to 30 wt % is prepared, oligomer content and unreacted monomer content are decreased, resulting in excellent heat resistance, significantly improved surface quality, and particularly, reduced generation of residue on a product surface when used in a closed high temperature environment and occurrence of mold deposits during injection molding.

Further, a second objective of the present invention is to provide an aromatic vinyl-unsaturated nitrile-based copolymer prepared using the above-described method and a heat-resistant resin composition including the aromatic vinyl-unsaturated nitrile-based copolymer.

Technical Solution

In order to achieve the objectives, according to an embodiment of the present invention, there is provided a method of preparing an aromatic vinyl-unsaturated nitrile-based copolymer in which a content of an oligomer is less than 0.5 parts by weight based on 100 parts by weight of the copolymer, a content of a residual monomer is less than 1,000 ppm, and a content of a structural unit derived from unsaturated nitrile monomers in the copolymer is in a range of 22 to 30 wt %, including: preparing a polymerization product by adding a polymerization initiator into a mixed solution prepared by adding an aromatic vinyl-based monomer and an unsaturated nitrile-based monomer into a reaction solvent, and then performing polymerization at 115 to 135° C. such that a monomer conversion ratio is 80% or more; and performing a devolatilization process on the polymerization product, where the aromatic vinyl-based monomer and unsaturated nitrile-based monomer are used in a weight ratio between 65:35 and 78:22 and the polymerization initiator includes an organic peroxide having a 1 hour half-life temperature in a range of 100 to 120° C. and is used in an amount of 0.01 to 0.08 parts by weight based on 100 parts by weight of the total monomers.

Further, according to another embodiment of the present invention, there is provided an aromatic vinyl-unsaturated nitrile-based copolymer prepared using the above-described preparation method.

Moreover, according to still another embodiment of the present invention, there is provided a heat-resistant resin composition including an aromatic vinyl-unsaturated nitrile-based copolymer prepared using the above-described preparation method.

Advantageous Effects

In a method of preparing an aromatic vinyl-unsaturated nitrile-based copolymer according to the present invention, when an aromatic vinyl-unsaturated nitrile-based copolymer in which a content of a structural unit derived from unsaturated nitrile monomers in the copolymer is in the range of 22 to 30 wt % is prepared, an aromatic vinyl-unsaturated nitrile-based copolymer in which oligomer content and unreacted monomer content are decreased while a high polymerization conversion rate is maintained can be prepared by using an optimal amount of a polymerization initiator having a 1 hour half-life temperature lower than the polymerization temperature by 10 to 25° C.

Further, an aromatic vinyl-unsaturated nitrile-based copolymer prepared using the preparation method according to the present invention and a heat-resistant resin composition including the aromatic vinyl-unsaturated nitrile-based copolymer have reduced oligomer content and unreacted monomer content, thereby exhibiting excellent heat resistance, significantly improved surface quality, and particularly, improved characteristics such as a reduction in generation of residue on a product surface when used in a closed high temperature environment and occurrence of mold deposits during injection molding.

BEST MODE OF THE INVENTION

Hereinafter, the present invention will be described in detail in order to facilitate understanding of the present invention.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In the present invention, when an aromatic vinyl-unsaturated nitrile-based copolymer in which the content of a repeating unit of a structure derived from unsaturated nitrile monomers (hereinafter, referred to simply as a "structural unit") in the copolymer is in the range of 22 to 30 wt % is prepared, an aromatic vinyl-unsaturated nitrile-based copolymer in which oligomer content and unreacted monomer content are reduced while a high polymerization conversion rate is maintained can be prepared by controlling the half-life and content of the polymerization initiator and the conversion ratio of the monomer.

Specifically, the method of preparing the aromatic vinyl-unsaturated nitrile-based copolymer according to an embodiment of the present invention includes a step (Step 1) of preparing a polymerization product by adding a polymerization initiator containing an organic peroxide having a 1 hour half-life temperature of 100 to 120° C. into a mixed solution prepared by adding an aromatic vinyl-based monomer and an unsaturated nitrile-based monomer into a reaction solvent at a weight ratio of 65:35 to 78:22 such that the content of the polymerization initiator is in the range of 0.01 to 0.08 parts by weight based on 100 parts by weight of the total monomers, and then performing polymerization at 115 to 135° C. such that a monomer conversion ratio is 80% or more; and a step (Step 2) of performing a devolatilization process on the polymerization product to prepare an aromatic vinyl-unsaturated nitrile-based copolymer in which oligomer content is less than 0.5 parts by weight based on 100 parts by weight of the copolymer, a content of a residual monomer is less than 1,000 ppm, and a content of a structural unit derived from unsaturated nitrile monomers in the copolymer is in a range of 22 to 30 wt %.

The term "half-life temperature" used in the present invention refers to a temperature at which 50% of a certain initial material is decomposed in a specific timeframe as an index indicating the decomposition rate of a certain material. For example, the 1 hour half-life temperature of the polymerization initiator represents a temperature at which the active oxygen content of the polymerization initiator is halved to 50% in 1 hour.

Further, the term "oligomer" used in the present invention refers to a polymer prepared by polymerizing monomers to a low degree, and specifically refers to a polymer having a weight average molecular weight of 500 g/mol or less.

Hereinafter, each step will be described in detail.

Step 1 is a step of performing the continuous solution polymerization of an aromatic vinyl-based monomer and an unsaturated nitrile-based monomer.

Specifically, Step 1 may be performed by adding a polymerization initiator into a mixed solution prepared by adding an aromatic vinyl-based monomer and an unsaturated nitrile-based monomer in a weight ratio between 65:35 and 78:22 to a reaction solvent, and then performing continuous solution polymerization at 115 to 135° C. such that a monomer conversion ratio is 80% or more.

Specifically, the aromatic vinyl-based monomer may be one or more selected from the group consisting of styrene, α-methylstyrene, p-bromostyrene, p-methylstyrene, p-chlorostyrene, and o-bromostyrene, and more specifically may be styrene.

Further, the unsaturated nitrile-based monomer may be one or more selected from the group consisting of acrylonitrile, methacrylonitrile, ethacrylonitrile, phenyl acrylonitrile, and α-chloroacrylonitrile, and specifically may be acrylonitrile.

The aromatic vinyl-based monomer and the unsaturated nitrile-based monomer may be used in a weight ratio between 65:35 and 78:22, and more specifically, the amount used thereof may be suitably determined according to the content of a structural unit derived from each monomer in the aromatic vinyl-unsaturated nitrile-based copolymer finally prepared within the above-mentioned mixing weight ratio range. Specifically, each monomer may be used such that the content of the structural unit derived from aromatic vinyl-based monomers is in the range of 70 to 78 wt % and the content of the structural unit derived from unsaturated nitrile monomers is in the range of 22 to 30 wt % in the aromatic vinyl-unsaturated nitrile-based copolymer according to the present invention. When the content of the unsaturated nitrile-based monomer satisfies the above-described content range, a polymerization conversion rate is increased, and the mechanical strength, heat resistance and surface properties of the copolymer prepared can be improved. Further, when the content of the aromatic vinyl-based monomer satisfies the above-described content range, a suitable polymerization rate can be maintained, and the heat resistance of the copolymer prepared can be improved. More specifically, each monomer may be used such that the content of the structural unit derived from aromatic vinyl-based monomers is in the range of 70 to 75 wt % and the content of the structural unit derived from unsaturated nitrile monomers is in the range of 25 to 30 wt % in the copolymer.

Further, examples of the reaction solvent include alcohols; aromatic hydrocarbons such as petroleum ether and ethylbenzene; halides such as carbon tetrachloride and chloroform; and ketone-based compounds such as methyl ethyl ketone and the like, and one or a mixture of two or more thereof may be used.

The reaction solvent may be used in an amount of 10 to 30 parts by weight based on 100 parts by weight of the total monomers. When the content of the reaction solvent is less than 10 parts by weight, it is difficult to control the polymerization reaction due to high viscosity of the mixed solution. When the content of the reaction solvent is more than 30 parts by weight, it may be difficult to effectively control the physical properties of the resulting polymer and to ensure polymerization productivity.

Further, specifically, the polymerization initiator may have a 1 hour half-life temperature in the range of 100 to 120° C. When the half-life temperature of the polymerization initiator is 100° C. or less, it is difficult to control conversion rate and molecular weight when the initiator is used. When the half-life temperature of the polymerization initiator is more than 120° C., it is difficult to achieve a sufficient polymerization conversion rate that results in improving the quality of the heat-resistant resin composition. Further, when both of the half-life temperature of the polymerization initiator and the polymerization reaction temperature are controlled, the polymerization conversion rate and the physical properties of the finally prepared copolymer can be enhanced. Accordingly, more specifically, the polymerization initiator may have a 1 hour half-life temperature lower than the polymerization temperature by 10 to 25° C., specifically by 10 to 22° C., and more specifically by 10 to 15° C.

Specifically, the polymerization initiator may be a compound containing 1 to 4 peroxy groups in its molecule. As such, when a compound that satisfies the above-described half-life temperature conditions and contains peroxy groups in the molecule is used as a polymerization initiator, the heat resistance of the copolymer prepared can be improved and the polymerization production rate can be increased. More specifically, examples of the polymerization initiator include 2,2-bis(4,4-di-t-butylperoxy cyclohexane) propane, 1,1-bis(t-butylperoxy)-3,3,5-trimethylcyclohexane, 1,1-bis(t-hexylperoxy)-3,3,5-trimethylcyclohexane, 1,1-bis(t-butylperoxy)-2-methylcyclohexane, 1,1-bis(t-hexylperoxy) cyclohexane, 1,1-bis(t-butylperoxy) cyclohexane, t-hexylperoxyisopropyl monocarbonate and the like, and one or a mixture of two or more thereof may be used.

The polymerization initiator may be used in an amount of 0.01 to 0.08 parts by weight based on 100 parts by weight of the total monomers. When the content of the polymerization initiator is less than 0.01 parts by weight, suppression of the generation of oligomer may be insufficient. When the content of the polymerization initiator is more than 0.08 parts by weight, the haze may increase due to an increase in viscosity of a reaction system and a sequence change of a polymer chain. More specifically, the polymerization initiator may be used in an amount of 0.04 to 0.07 parts by weight based on 100 parts by weight of the total monomers.

The polymerization reaction may be performed at a temperature in the range of 115 to 135° C. When the temperature of the polymerization reaction is adjusted to within the above-described range, generation of oligomers produced during polymerization may be reduced. When the temperature during the polymerization reaction is less than 115° C., a polymerization conversion rate may be lowered. When the temperature during the polymerization reaction is more than 135° C., the content of residue such as oligomers is increased, and thus quality may be deteriorated when preparing a heat-resistant resin composition. More specifically, the polymerization reaction may be performed at a temperature in the range of 120 to 130° C.

Further, a molecular weight regulator may selectively be further added during the polymerization reaction.

Specifically, the molecular weight regulator may be n-dodecyl mercaptan, n-amyl mercaptan, t-butyl mercaptan, t-dodecyl mercaptan, n-hexyl mercaptan, n-octyl mercaptan, n-nonyl mercaptan, or the like, and one or a mixture of two or more thereof may be used. The molecular weight regulator may be used in an amount of 0.01 to 0.5 parts by weight based on 100 parts by weight of the total monomers. When the content of the molecular weight regulator is less than 0.01 parts by weight or more than 0.5 parts by weight, it is difficult to control the molecular weight of the copolymer, and thus improvement in processability and mechanical properties of a heat-resistant resin composition including the copolymer may be reduced. More specifically, the molecular weight regulator may be used in an amount of 0.2 to 0.3 parts by weight based on 100 parts by weight of the total monomers.

The polymerization reaction may be performed until the polymerization conversion rate of the monomer is 80% or more, more specifically 84% or more.

Next, Step 2 is a step of performing a devolatilization process on the polymerization product in order to remove the unreacted monomer, the oligomer, and the reaction solvent from a polymerization product prepared in Step 1 and to prepare a desired aromatic vinyl-unsaturated nitrile-based copolymer.

Specifically, the devolatilization process may be performed in a temperature range of 230 to 250° C. and a pressure condition of 20 torr or less. When the process is performed under the above-described conditions, removal of the oligomer produced during the polymerization reaction can be maximized. More specifically, as pretreatment before the devolatilization process, a pre-devolatilization process may be carried out in a temperature range of 150 to 160° C. under a pressure condition of 400 torr or less, and in this case, the devolatilization process may be performed in a multi-step process including a first devolatilization process conducted in a temperature range of 150 to 160° C. under a pressure condition of 400 torr or less and a subsequent second devolatilization process conducted in a temperature range of 230 to 250° C. under a pressure condition of 20 torr or less.

An aromatic vinyl-unsaturated nitrile-based copolymer in which the content of the structural unit derived from unsaturated nitrile monomers in the copolymer is in the range of 25 to 40 wt % can be prepared using the above-described method, and the oligomer content and the unreacted monomer content generated in this case can be significantly reduced. Specifically, the content of the oligomer may be less than 0.5 wt %, and the content of the unreacted monomer may be less than 1,000 ppm.

Accordingly, the contents of the oligomer and the unreacted monomer are reduced when the copolymer prepared using the above-described preparation method is included in a heat-resistant resin composition, heat resistance is excellent, surface quality is significantly improved, and particularly, generation of residue on a product surface when used in a closed high temperature environment and occurrence of mold deposits during injection molding can be reduced.

According to another embodiment of the present invention, there is provided an aromatic vinyl-unsaturated nitrile-based copolymer prepared using the above-described preparation method.

Specifically, the aromatic vinyl-unsaturated nitrile-based copolymer may be an aromatic vinyl-unsaturated nitrile-based copolymer in which the content of the structural unit derived from unsaturated nitrile monomers in the copolymer may be in the range of 22 to 30 wt %, and more specifically, may be an aromatic vinyl-unsaturated nitrile-based copolymer in which the content of the structural unit derived from unsaturated nitrile monomers in the copolymer may be in the range of 25 to 30 wt %, the polymerization conversion rate is 80% or more, and the weight average molecular weight (Mw) is 130,000 or more, and more specifically may be a styrene-acrylonitrile-based copolymer.

Specifically, the aromatic vinyl-unsaturated nitrile-based copolymer may have a weight average molecular weight of 130,000 g/mol or more, and more specifically 130,000 to 150,000 g/mol. When the weight average molecular weight is within the above-described range, excellent chemical resistance and impact resistance can be achieved. In the present invention, the weight average molecular weight of the aromatic vinyl-unsaturated nitrile-based copolymer is determined by calculating an elution curve obtained by gel permeation chromatography analysis for standard polystyrene.

Further, the aromatic vinyl-unsaturated nitrile-based copolymer may have a glass transition temperature (Tg) in the range of 110 to 120° C., and more specifically 113 to 115° C. When the glass transition temperature is within the above-described range, excellent heat resistance can be attained, and as a result, heat resistance can be improved when the copolymer is included in the heat resistant resin composition. In the present invention, a glass transition temperature (Tg) may be measured using 10 mg of each resin under the conditions of a heating rate of 10° C./min and a nitrogen flow of 50 cc/min with a differential scanning calorimeter (DSC) Q20 DSC manufactured by TA Instruments, Inc.

Moreover, according to still another embodiment of the present invention, there is provided a heat-resistant resin composition including an aromatic vinyl-unsaturated nitrile-based copolymer prepared using the above-described preparation method.

Specifically, the heat-resistant resin composition may include the above-described aromatic vinyl-unsaturated nitrile-based copolymer in an amount of 60 to 90 wt %, and more specifically 70 to 85 wt %. When the copolymer is included within the above-described content range, more excellent heat resistance and surface properties can be exhibited.

Further, the heat-resistant resin composition may further include an impact modifier in addition to the above-described copolymer.

Specifically, the impact modifier may be an acrylonitrile-conjugated diene-aromatic vinyl copolymer (hereinafter referred to simply as an "ABS resin") including structural units derived from acrylonitrile-based monomers, conjugated diene monomers, and aromatic vinyl monomers, and specifically may be a graft copolymer obtained by graft-polymerizing an acrylonitrile-based monomer and an aromatic vinyl compound with a conjugated diene rubber.

The above-described impact modifier may be included in an amount of 10 to 40 wt %, and more specifically 15 to 30 wt % based on the total weight of the heat-resistant resin composition. When the impact modifier is within the above-described range, excellent mechanical strength properties can be achieved.

The heat-resistant resin composition including the above-described components may further include one or more additives selected from an antioxidant, a lubricant, an antistatic agent, a release agent, and a UV stabilizer depending on the application.

Specifically, the antioxidant may be a hindered phenol-based antioxidant, a phosphorus-based antioxidant, or a mixture thereof, and may be included in an amount of 0.05 to 1 wt % based on the total weight of the heat-resistant resin composition. When the antioxidant is included within the above-described content range, heat resistance and weather resistance of the heat-resistant resin composition can be further improved.

Specifically, the lubricant may be ethylene bisstearamide, oxidized polyethylene wax, magnesium stearate, or the like, and one or a mixture of two or more thereof may be used. The lubricant may be used in an amount of 0.05 to 3 wt % based on the total weight of the heat-resistant resin composition. When the lubricant is included within the above-described content range, heat resistance and weather resistance of the heat-resistant resin composition can be further improved.

Further, TINUVIN 326 (manufactured by BASF) which is an ultraviolet absorber may be used as the UV stabilizer, and the UV stabilizer may be included in an amount of 0.05 to 2 wt % based on the total weight of the heat-resistant resin composition.

The heat-resistant resin composition having the above-described structure according to an embodiment of the present invention can exhibit excellent heat resistance, significantly improved surface quality, and particularly, improved characteristics such as reduced generation of residue on a product surface when using in a closed high temperature environment and reduced occurrence of mold deposits during injection molding.

Specifically, the heat-resistant resin composition has a fogging haze of less than 2.0, representing residue properties, a Vicat softening temperature (heat resistance) of 98° C. or more, an impact strength of 25 or more and no occurrence of mold deposits.

MODES OF THE INVENTION

Hereinafter, the present invention is described in greater detail with reference to examples and experimental examples. However, the examples and experimental examples described below are for exemplifying the present invention, and the scope of the present invention is not limited thereto.

Example 1

71 parts by weight of styrene and 29 parts by weight of acrylonitrile were dissolved in toluene (TLN) to prepare a mixed solution. Here, toluene was used in an amount of 25 parts by weight based on 100 parts by weight of the total weight of whole monomers. Further, 0.05 parts by weight of 1,1-bis(t-butylperoxy) cyclohexane as a polymerization initiator and 0.21 parts by weight of t-dodecylmercaptan (TDDM) as a molecular weight regulator were added to the mixed solution based on 100 parts by weight of the total weight of whole monomers, and copolymerization was carried out at a reaction temperature of 130° C. The resultant polymerization product was subjected to a devolatilization process at a temperature of 230° C. and a pressure of 20 torr to prepare a styrene-acrylonitrile (SAN) copolymer.

73 parts by weight of the SAN copolymer thus prepared was mixed with 27 parts by weight of ABS DP (SAN-grafted polybutadiene), 0.25 parts by weight of an antioxidant and 0.7 parts by weight of a lubricant, and a heat-resistant resin composition was prepared after compounding. The heat-resistant resin composition was subjected to injection molding to prepare a specimen.

Examples 2 to 5

Each of a SAN copolymer and a heat-resistant resin composition was prepared in the same manner as in Example 1 except for the amounts of the materials used, as listed in the following Table 1.

Example 6

Each of a SAN copolymer and a heat-resistant resin composition was prepared in the same manner as in Example 1 except that the polymerization product prepared in Example 1 was subjected to a first devolatilization process at a temperature of 150° C. and a pressure of 400 torr and then to a second devolatilization process at a temperature of 230° C. and a pressure of 20 torr.

Comparative Example 1

0.1 parts by weight of t-dodecylmercaptan (TDDM) as a molecular weight regulator was added to a mixed solution prepared by mixing 71 parts by weight of styrene, 29 parts by weight of acrylonitrile, and 25 parts by weight of toluene, and copolymerization was carried out at a reaction temperature of 155° C. to prepare a styrene-acrylonitrile (SAN) copolymer. 73 parts by weight of the SAN copolymer thus prepared was mixed with 27 parts by weight of ABS DP, 0.25 part by weight of an antioxidant, and 0.7 part by weight of a lubricant, and a heat-resistant resin composition was prepared after compounding. The heat-resistant resin composition was subjected to injection molding to prepare a specimen.

Comparative Examples 2 to 10

Each of a SAN copolymer and a heat-resistant resin composition was prepared in the same manner as in Example 1 except for the amounts of the materials used, as listed in the following Table 1.

In Table 1, "wt %" represents the ratio of the weight of the corresponding monomeric material based on the total weight of the total monomers as a percentage, and "parts by weight" is a relative ratio of the amount of the corresponding material used based on 100 parts by weight of the total weight of the total monomers.

Further, SM refers to a styrene monomer, AN refers to acrylonitrile, and AMS refers to alpha methyl styrene in Table 1.

Further, the polymerization initiator A is t-butyl peroxy-2-ethylhexanoate (1 hour half-life temperature=92° C.), the polymerization initiator B is 1,1-bis(t-butylperoxy) cyclohexane (1 hour half-life temperature=109° C.), and the polymerization initiator C is dicumyl peroxide (1 hour half-life temperature=136° C.) in Table 1.

Experimental Example

In order to compare and analyze the properties of each of the SAN copolymers and the heat-resistant resin compositions prepared in Examples 1 to 6 and Comparative Examples 1 to 10, the following analyses were carried out for each resin. The results are shown in the following Table 2.

1) Component analysis

The content of the structural unit derived from acrylonitrile contained in each of the SAN copolymers was analyzed using an IR method.

2) Weight average molecular weight (Mw): the prepared SAN copolymer was dissolved in tetrahydrofuran, and the elution curve obtained by gel permeation chromatography analysis was calculated for standard polystyrene.

3) Oligomer content

The oligomer content was calculated as a relative area ratio based on a TLN area using gas chromatography (GC/FID).

4) Residual monomer content

The residual monomer content was quantified using gas chromatography (GC/FID).

5) Fogging haze: after 15 g of pellets of the heat-resistant resin composition was placed in a 200 ml-organic container, the container was placed in an oil bath maintained at a

TABLE 1

|  |  | Examples | | | | | | Comparative Examples | | | | | | | | | |
|---|---|---|---|---|---|---|---|---|---|---|---|---|---|---|---|---|---|
|  |  | 1 | 2 | 3 | 4 | 5 | 6 | 1 | 2 | 3 | 4 | 5 | 6 | 7 | 8 | 9 | 10 |
| Monomer | SM | 71 | 71 | 75 | 75 | 71 | 71 | 71 | 71 | 71 | 71 | 71 | 71 | 41 | 80 | 71 | 71 |
| (wt %) | AN | 29 | 29 | 25 | 25 | 29 | 29 | 29 | 29 | 29 | 29 | 29 | 29 | 29 | 20 | 29 | 29 |
|  | AMS | — | — | — | — | — | — | — | — | — | — | — | — | 30 | — | — | — |
| Solvent (parts by weight) |  | 25 | 25 | 25 | 25 | 25 | 25 | 25 | 25 | 25 | 25 | 25 | 25 | 25 | 25 | 25 | 25 |
| Reaction temperature (° C.) |  | 130 | 130 | 120 | 125 | 120 | 130 | 130 | 145 | 105 | 120 | 120 | 150 | 130 | 130 | 100 | 130 |
| Polymerization initiator | A | — | — | — | — | — | — | — | — | — | O | — | — | — | — | — | — |
|  | B | O | O | O | O | O | O | — | O | O | — | — | — | O | O | O | O |
|  | C | — | — | — | — | — | — | — | — | — | — | O | O | — | — | — | — |
| Polymerization initiator (parts by weight) |  | 0.05 | 0.07 | 0.07 | 0.06 | 0.04 | 0.05 | — | 0.03 | 0.07 | 0.07 | 0.06 | 0.03 | 0.05 | 0.05 | 0.05 | 0.08 |
| Molecular weight regulator (parts by weight) |  | 0.21 | 0.25 | 0.23 | 0.22 | 0.27 | 0.21 | 0.1 | 0.1 | 0.3 | 0.2 | 0.25 | 0.1 | 0.1 | 0.21 | 0.21 | 0.21 | temperature of 100° C. The upper part of the container was covered with a transparent glass plate capable of being sealed and cooled and was allowed to stand for 24 hours, and the haze of the glass plate was measured according to ASTM 1003. High haze indicates that residues are generated in a large amount and condensed on a glass plate.

6) Vicat softening temperature (VST): the Vicat softening temperature was measured according to ASTM D1525.

7) Izod impact strength: the Izod impact strength was measured according to ASTM D256.

8) Mold deposit: after 100 continuous injections using a specimen mold with a size of 100×100×3, the state of the mold surface was confirmed with the naked eye and scored (1: excellent, 5: very poor).

TABLE 2

| | | Examples | | | | | | Comparative Examples | | | | | | | | | |
|---|---|---|---|---|---|---|---|---|---|---|---|---|---|---|---|---|---|
| | | 1 | 2 | 3 | 4 | 5 | 6 | 1 | 2 | 3 | 4 | 5 | 6 | 7 | 8 | 9 | 10 |
| Physical properties of SAM copolymer | Conversion rate (%) | 83 | 84 | 81 | 80 | 80 | 80 | 75 | 81 | 63 | 91 | 62 | 82 | 65 | 64 | 46 | 93 |
| | AN content (wt %) | 27.1 | 27.2 | 24.3 | 24.2 | 27.2 | 27.1 | 26.9 | 27.1 | 27.3 | 27.3 | 27.1 | 27.1 | 28.1 | 19.2 | 26.8 | 27.1 |
| | Molecular weight (×10$^4$ g/mol) | 13.2 | 13.1 | 13.5 | 13.8 | 13.3 | 13.3 | 13.1 | 13.3 | 13.1 | 10 | 15 | 12.4 | 11 | 15.4 | 19 | 12.2 |
| | Oligomer content (wt %) | 0.31 | 0.26 | 0.24 | 0.29 | 0.28 | 0.29 | 2.08 | 1.45 | 0.21 | 0.23 | 0.29 | 1.64 | 2.12 | 0.31 | 0.29 | 0.31 |
| | Residual monomer content (ppm) | 670 | 650 | 704 | 713 | 721 | 350 | 860 | 823 | 1064 | 540 | 1432 | 841 | 970 | 1584 | 3874 | 1029 |
| | Tg (° C.) | | | | | | | | | | | | | | | | |
| Physical properties of ABS resin | Fogging haze (%) | 1.2 | 1.1 | 1.1 | 1.1 | 1.1 | 1.1 | 4.4 | 4.1 | 1.3 | 1.1 | 1.1 | 3.9 | 5.3 | 2.7 | 2.8 | 1.8 |
| | Vicat softening temperature (° C.) | 99.2 | 99.4 | 99.2 | 99.1 | 99.1 | 99.3 | 97.5 | 97.8 | 99 | 97.3 | 99.1 | 97.6 | 101 | 97.2 | 98 | 98.4 |
| | Impact strength (kg · cm/cm) | 29 | 28 | 26 | 25 | 28 | 29 | 28 | 27 | 28 | 22 | 31 | 23 | 19 | 19 | 33 | 24 |
| | Mold deposit (score) | 2 | 1 | 1 | 1 | 1 | 1 | 5 | 5 | 1 | 1 | 3 | 4 | 5 | 3 | 4 | 2 |

As a result of the experiments, in the case of Examples 1 to 6 in which SAN copolymers were prepared according to the preparation method according to the present invention, the prepared SAN copolymer had a high conversion ratio of 80% or more, while the oligomer content and residual monomer content were greatly reduced. Particularly, the residual monomer content was significantly reduced compared to those of Comparative Examples 1 to 10.

Further, when compared to Comparative Examples 1 to 10, the ABS resin compositions of Examples 1 to 6, which include the SAN copolymers prepared using the preparation method according to the present invention, exhibited significantly lower fogging haze while maintaining excellent strength properties were maintained and reduced mold deposits due to the reduction of the residue content.

The invention claimed is:

1. A method of preparing an aromatic vinyl-unsaturated nitrile-based copolymer of an injection molding resin, in which a content of an oligomer is less than 0.5 parts by weight based on 100 parts by weight of the copolymer, a content of a residual monomer is less than 1,000 ppm, and a content of a structural unit derived from unsaturated nitrile monomers in the copolymer is in a range of 22 to 30 wt %, the method comprising:
preparing a polymerization product by adding a polymerization initiator into a mixed solution prepared by adding an aromatic vinyl-based monomer and an unsaturated nitrile-based monomer into a reaction solvent, and then performing polymerization at 115 to 135° C. until a monomer conversion ratio is 80% or more; and
performing a devolatilization process on the polymerization product,
wherein the aromatic vinyl-based monomer and unsaturated nitrile-based monomer are used in a weight ratio of 65:35 to 78:22, and
the polymerization initiator includes an organic peroxide having a 1 hour half-life temperature in a range of 100 to 120° C. and is used in an amount of 0.01 to 0.08 parts by weight based on 100 parts by weight of total monomers,
wherein a molecular weight regulator is further included in an amount of 0.21 to 0.27 parts by weight based on 100 parts by weight of the total monomers during the polymerization, and whereupon a fogging haze of the injection molding resin is less than 2.0 as measured according to ASTM 1003.

2. The method of claim 1, wherein the polymerization initiator includes an organic peroxide containing 1 to 4 peroxy groups in a molecule.

3. The method of claim 1, wherein the polymerization initiator includes one or more selected from the group consisting of 2,2-bis(4,4-di-t-butylperoxy cyclohexyl) propane, 1,1-bis(t-butylperoxy)-3,3,5-trimethylcyclohexane, 1,1-bis(t-hexylperoxy)-3,3,5-trimethylcyclohexane, 1,1-bis (t-butylperoxy)-2-methylcyclohexane, 1,1-bis(t-hexylperoxy) cyclohexane, 1,1-bis(t-butylperoxy) cyclohexane, and t-hexylperoxyisopropyl monocarbonate.

4. The method of claim 1, wherein a difference between a 1 hour half-life temperature of the polymerization initiator and a polymerization temperature is in a range of 10 to 25° C.

5. The method of claim 1, wherein the molecular weight regulator includes one or more compound selected from the group consisting of n-dodecyl mercaptan, n-amyl mercaptan, t-butyl mercaptan, t-dodecyl mercaptan, n-hexyl mercaptan, n-octyl mercaptan, and n-nonyl mercaptan.

6. The method of claim 1, wherein the devolatilization is performed at a temperature range of 230 to 250° C. and a pressure of 20 torr or less.

* * * * *